(12) United States Patent
Jain et al.

(10) Patent No.: US 10,323,964 B2
(45) Date of Patent: Jun. 18, 2019

(54) MOTION DETECTION DEVICE HAVING DETACHABLE SENSOR

(71) Applicant: DELTA ELECTRONICS, INC., Taoyuan (TW)

(72) Inventors: Shin-Chung Jain, Taoyuan (TW); Tien-Szu Lo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 386 days.

(21) Appl. No.: 15/226,122

(22) Filed: Aug. 2, 2016

(65) Prior Publication Data

US 2017/0205257 A1 Jul. 20, 2017

(30) Foreign Application Priority Data

Jan. 19, 2016 (TW) ............................. 105101473 A

(51) Int. Cl.
*G01D 11/30* (2006.01)
*G01D 11/24* (2006.01)
*G01H 3/00* (2006.01)
*G01V 8/00* (2006.01)

(52) U.S. Cl.
CPC ............. *G01D 11/245* (2013.01); *G01H 3/00* (2013.01); *G01V 8/00* (2013.01)

(58) Field of Classification Search
CPC .......... G01D 11/245; G01H 3/00; G01V 8/00; G03B 17/561
See application file for complete search history.

(56) References Cited

U.S. PATENT DOCUMENTS 8,789,378 B2 * 7/2014 Chang .................... G01R 33/04
62/3.1
9,304,375 B2 * 4/2016 Moon .................... F16M 11/14

FOREIGN PATENT DOCUMENTS

| CN | 201266099 Y | 7/2009 |
| CN | 103557418 A | 2/2014 |
| CN | 104079868 A | 10/2014 |
| CN | 204007676 U | 12/2014 |
| CN | 204009110 U | 12/2014 |

(Continued)

OTHER PUBLICATIONS

Amaryllo, "Amaryllo iCamPro FHD Overview",< https://www.youtube.com/watch?v=J4S5-6OeMNg >, Dec. 19, 2014.

*Primary Examiner* — Harshad R Patel
*Assistant Examiner* — Nigel H Plumb
(74) *Attorney, Agent, or Firm* — Kirton McConkie; Evan R. Witt

(57) ABSTRACT

A motion detection device having a detachable sensor is disclosed and including a main body, a rotating and swing module, and at least one detachable detecting module. The main body has a receiving space and a clamp part. The rotating and swing module is disposed in the receiving space and has a rotating disc and a swing rail. The rotating disc is clamped by the clamp part and rotated in a clockwise and counterclockwise motion at a horizontal angle relative to the main body. The swing rail is disposed on the rotating disc. The detachable detecting module has the sensor and an engaged unit detachably engaged with the swing rail, and the detachable detecting module is swung along the swing rail so that the detachable sensor of the detachable detecting module is swung along the swing rail at a deflecting angle relative to the rotating disc for motion detection.

19 Claims, 19 Drawing Sheets

(56) References Cited

FOREIGN PATENT DOCUMENTS

| | | |
|---|---|---|
| CN | 204539341 U | 8/2015 |
| CN | 204720047 U | 10/2015 |
| TW | M482760 U | 7/2014 |

\* cited by examiner

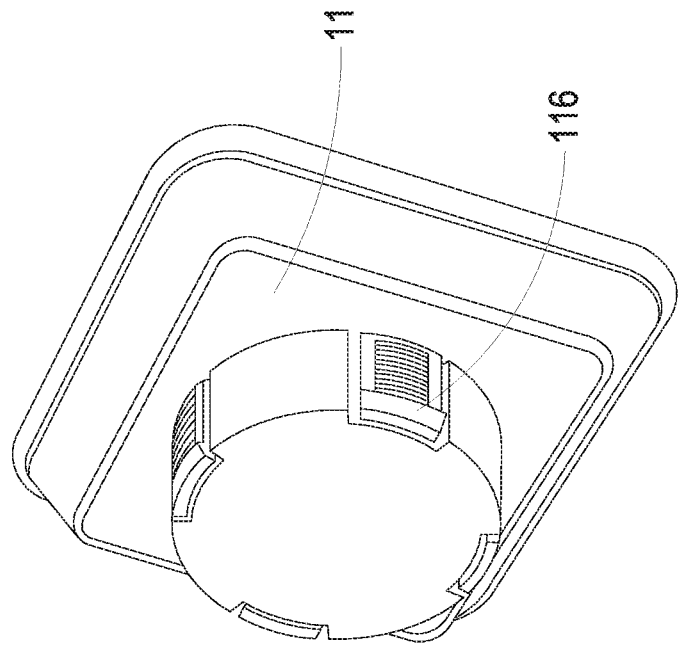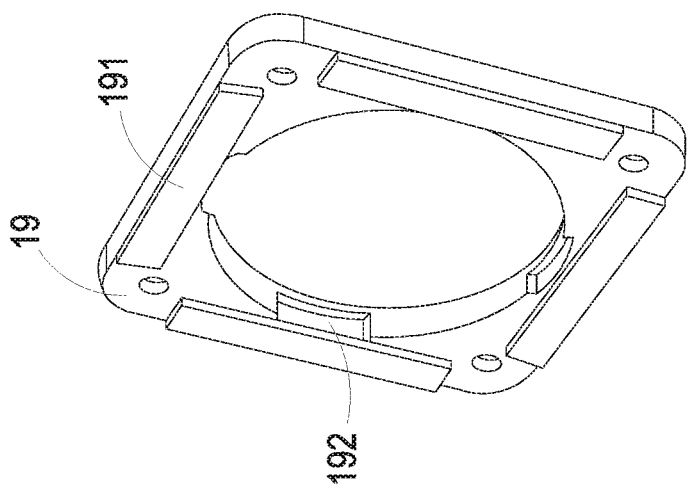
FIG. 11

MOTION DETECTION DEVICE HAVING DETACHABLE SENSOR

FIELD OF THE INVENTION

The present invention relates to a detecting apparatus, and more particularly to a detecting apparatus having a detachable detecting module.

BACKGROUND OF THE INVENTION

Environment detection or motion detection is the process of detecting a change in the position of an object relative to its surroundings or a change in the surroundings relative to an object. Motion detection can be achieved by either mechanical or electronic methods. Generally, an infrared sensor, an optical photographing system, a sound or vibration sensor, or a magnetic sensor is employed as the motion detection sensor to perform the motion detection. The infrared sensor is the most commonly used sensor for such detection owing to the better detecting effect and accuracy thereof. However, the detectable angles of the motion-detection sensors are usually limited by installation angles and installation positions of the motion-detection sensors, and the motion-detection sensors can only recognize the changes of the detected images within a specific zone. When the detectable angle of the motion-detection sensor is limited, the motion-detection sensors fail to detect the moving objects efficiently and fail to avoid the interference of surrounding lighting at the same time.

If the presences of the static object or people can't be detected by the motion-detection sensors, the security controls of human and surrounding can't be accomplished. Therefore, the detectable angle of a detecting apparatus has a large influence over the property of the detecting apparatus. By the limitation of the detectable angle, the detecting apparatus must be installed in an optimal position for obtaining the largest detectable angle. It is not easy to adjust the detectable angle of the installed detecting apparatus, and it will consume a lot of manpower to detach or maintain the installed detecting apparatus.

On the other hand, the sensitivity of the detecting apparatus may be affected by the surrounding obviously. When the detected surrounding is changed, the sensitivities of different detecting apparatuses are influenced differently. Consequently, the conventional detecting apparatus fails to provide the detecting module in different type according to the surrounding change and the optimal efficiency of environment monitoring can't be achieved.

Therefore, there is a need of providing a detecting apparatus having a detachable detecting module in order to achieve the purpose of environment monitoring according to the surrounding change and the implements in different environments, and overcome the above drawbacks encountered by the prior arts.

SUMMARY OF THE INVENTION

The present invention provides a detecting apparatus having a detachable detecting module. The detachable detecting module of the detecting apparatus can be adjusted and rotated according to the user requirements so as to obtain a larger detectable angle. The detectable angle of the detecting apparatus can be adjusted according to the monitoring environment by a manual operation or a motor-driven operation. In addition, plural detecting sensors can be combined and introduced into the detachable detecting module to increase the detectable angle.

The present invention further provides a detecting apparatus having a detachable detecting module. The detecting module of the detecting apparatus is detachable, and the detectable angle of the detecting module is adjustable according to the practical requirements. When the detecting module needs to be maintained or replaced by the user, it is easy to detach the detecting module from the main body of the detecting apparatus and maintain or replace the original detecting module with another one having same or different type.

In accordance with an aspect of the present invention, there is provided a detecting apparatus. The detecting apparatus includes a main body, a rotating and swing module, and at least one detachable detecting module. The main body has a receiving space. The rotating and swing module is disposed in the receiving space and has a rotating disc and a swing rail. The rotating disc is buckled on the main body and capable of being rotated at a horizontal angle relative to the main body. The swing rail is disposed on the rotating disc. The detachable detecting module has an engaged unit detachably engaged with the swing rail, and the detachable detecting module is capable of being swung along the swing rail so that the detachable detecting module is swung a deflecting angle relative to the rotating disc.

The above contents of the present invention will become more readily apparent to those ordinarily skilled in the art after reviewing the following detailed description and accompanying drawings, in which:

BRIEF DESCRIPTION OF THE DRAWINGS

FIG. 11 is a perspective view illustrating a second fixing mechanism for the detecting apparatus of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
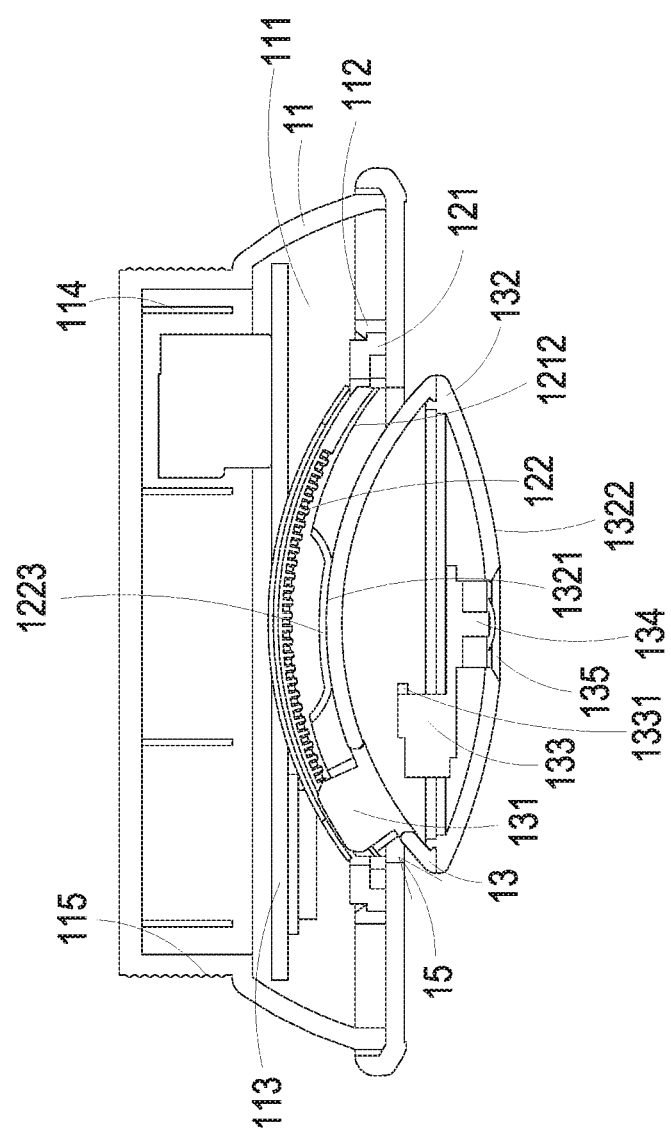
FIG. 1A is a schematic cross-sectional view illustrating a detecting apparatus having a detachable detecting module according to a first embodiment of the present invention.
Figure 1B:
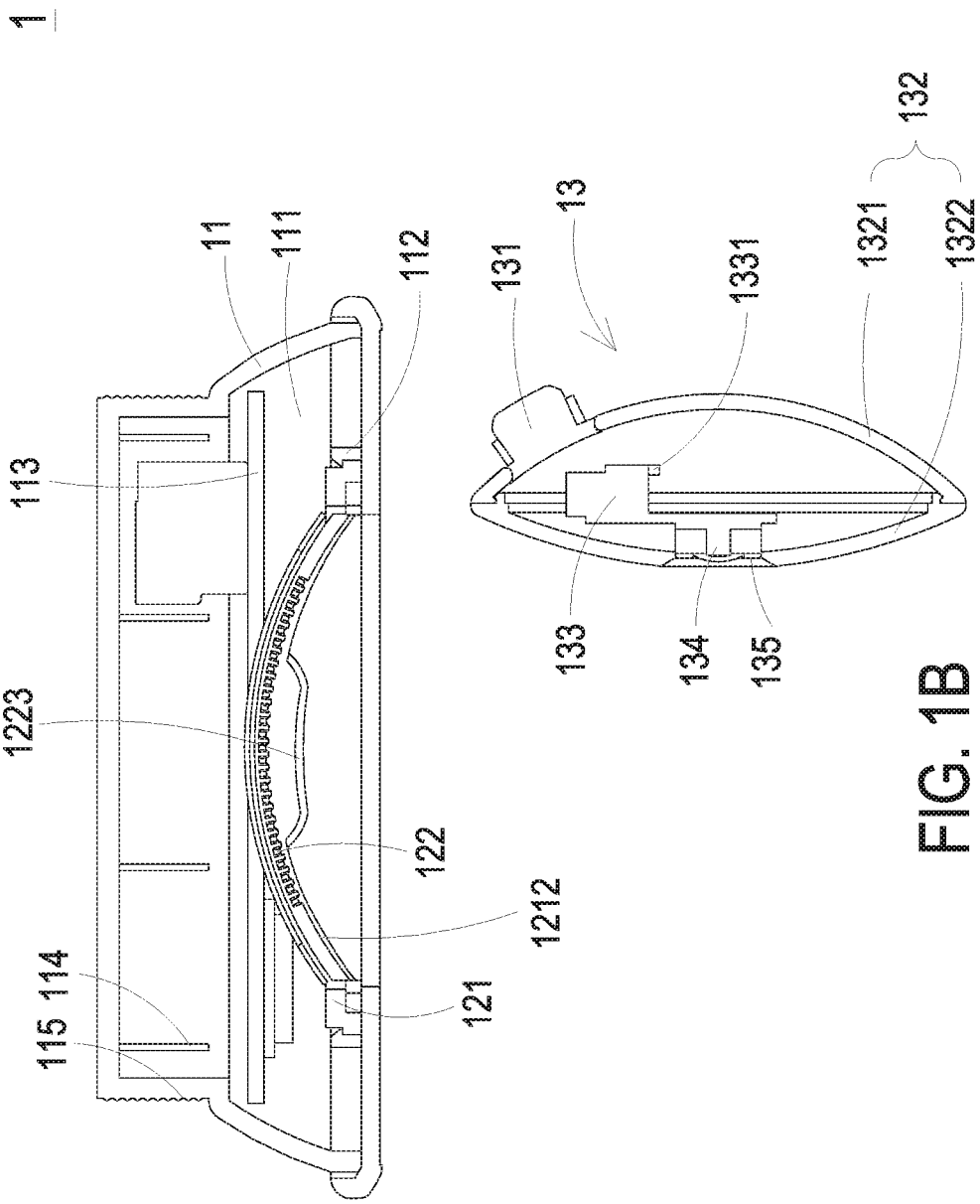
FIG. 1B is a schematic cross-sectional view illustrating the detachable detecting module detached from the detecting apparatus of FIG. 1A.
Figure 1C:
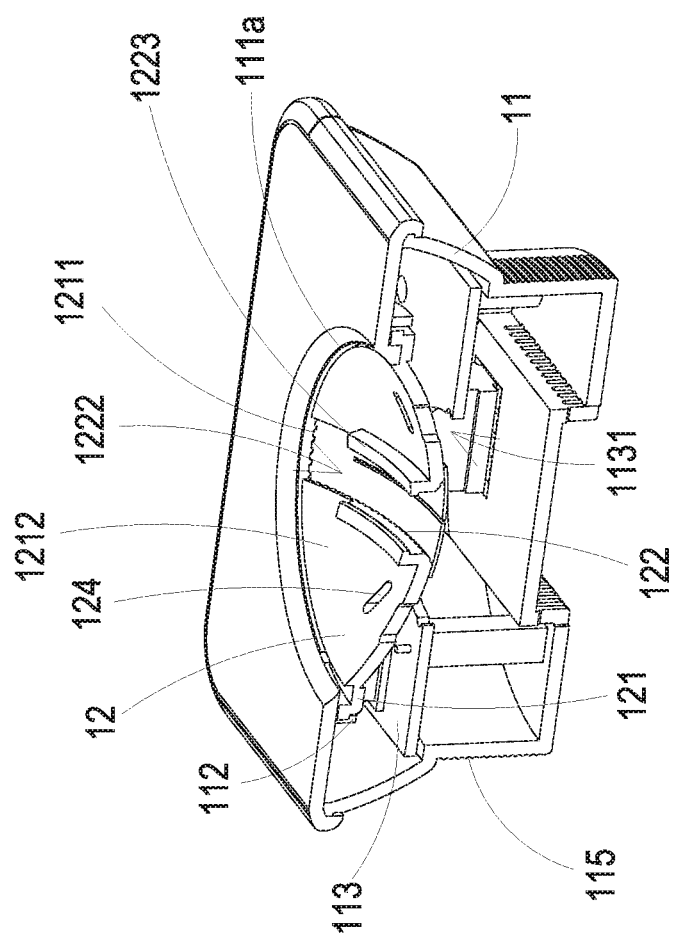
FIG. 1C is a schematic cross-sectional view illustrating a portion of the detecting apparatus having the detachable detecting module of FIG. 1A.
Figure 1D:
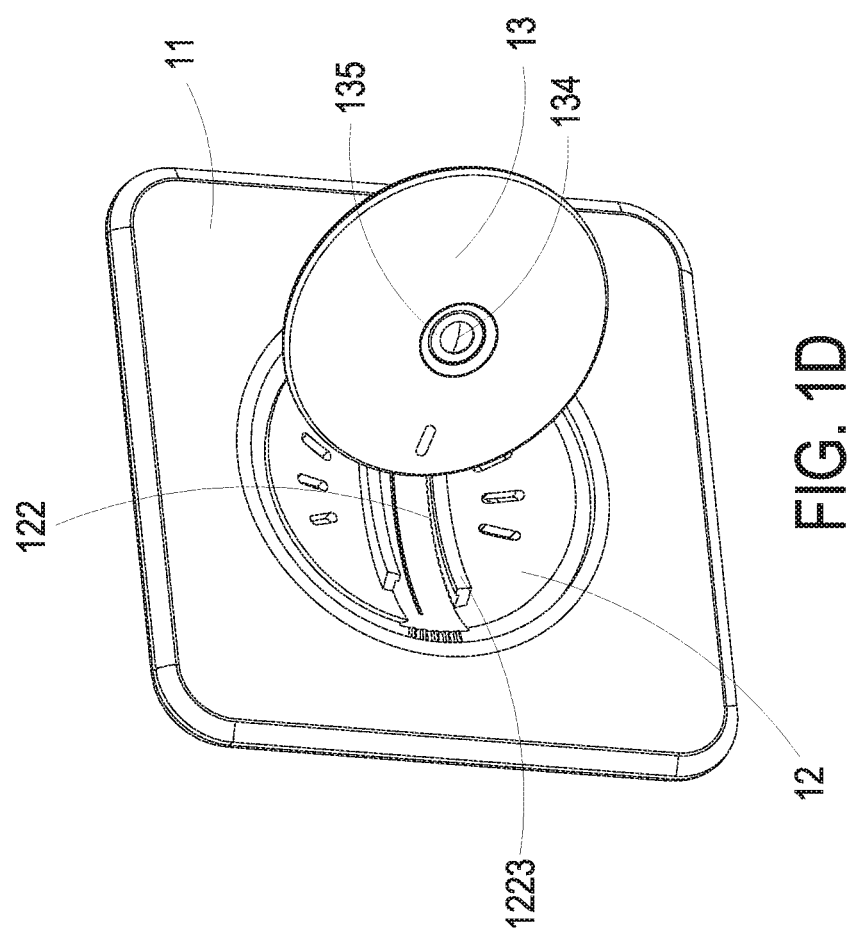
FIG. 1D is a perspective view illustrating the detecting apparatus having the detachable detecting module of FIG. 1A.

Please refer to FIGS. 1A to 1D. FIG. 1A is a schematic cross-sectional view illustrating a detecting apparatus having a detachable detecting module according to a first embodiment of the present invention. FIG. 1B is a schematic cross-sectional view illustrating the detachable detecting module detached from the detecting apparatus of FIG. 1A. FIG. 1C is a schematic cross-sectional view illustrating a portion of the detecting apparatus having the detachable detecting module of FIG. 1A. FIG. 1D is a perspective view illustrating the detecting apparatus having the detachable detecting module of FIG. 1A. As shown in FIGS. 1A to 1D, the detecting apparatus 1 of the present invention includes a main body 11, a rotating and swing module 12, and at least one detachable detecting module 13. The main body 11 has a receiving space 11. The rotating and swing module 12 is disposed in the receiving space 111 of the main body 11 and has a rotating disc 121 and a swing rail 122. The main body 11 further includes a clamp part 112 disposed adjacent to an opening 111a of the receiving space 111 for clamping the rotating disc 121. Preferably, the main body 11 includes a pair of hooks respectively disposed close to two opposite edges of the opening 111a. Consequently, the rotating disc 121 is disposed in the receiving space 111 of the main body 11, buckled to the main body 11, and capable of being rotated at a horizontal angle relative to the main body 11. In this embodiment, at least one portion of the peripheral edge of the rotating disc 121 is clamped by the clamp part 112, and the rotating disc 121 is capable of being rotated at a horizontal angle in a clockwise and counterclockwise motion relative to the main body 11. A maximum horizontal angle is for example but not limited to 45°. Consequently, the swing rail 122 of the rotating and swing module 12 can be rotated with the rotating disc 121 at the same horizontal angle relative to the main body 11. Furthermore, the detachable detecting module 13 has an engaged unit 131 corresponding to the swing rail 122 and detachably engaged with the swing rail 122. Consequently, the detachable detecting module 13 can be swung at a deflecting angle relative to the rotating disc 121 along the swing rail 122, as shown in FIG. 1D. In the embodiment, a maximum deflecting angle is for example but not limited to 50°.

Figure 2:
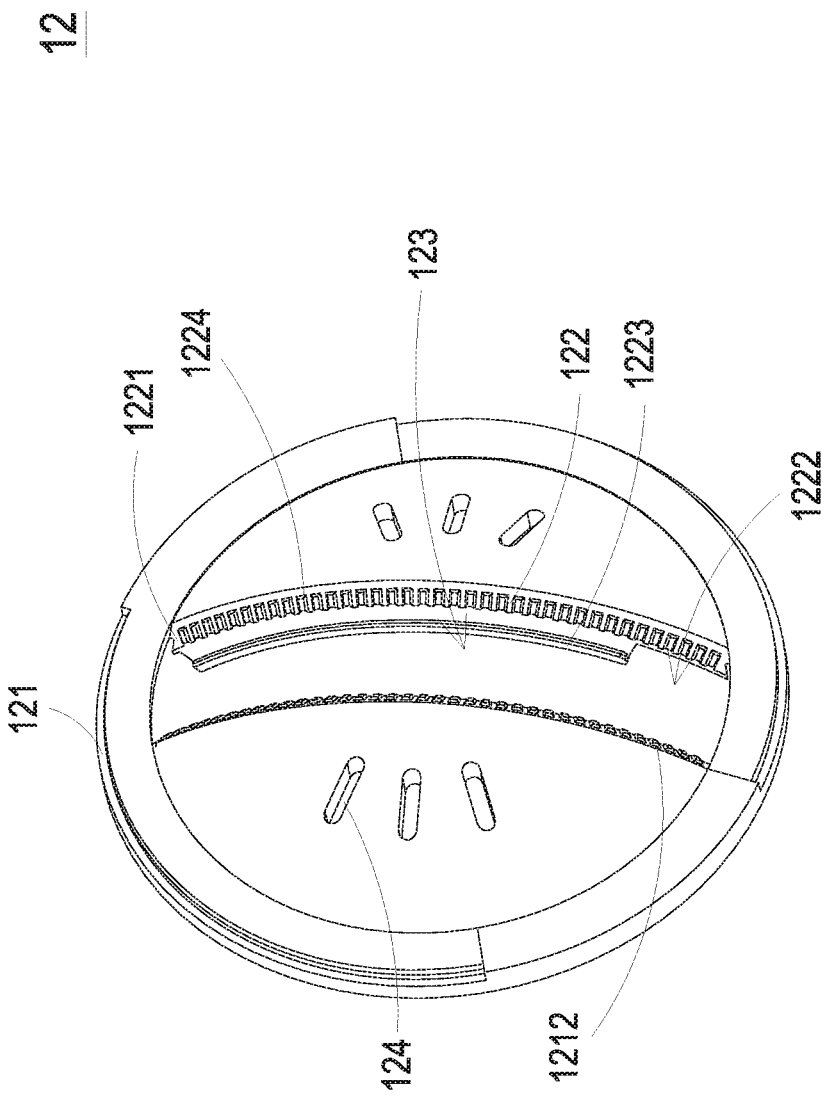
FIG. 2 is a perspective view illustrating the rotating and swing module of the detecting apparatus of FIG. 1A.
Figure 3:
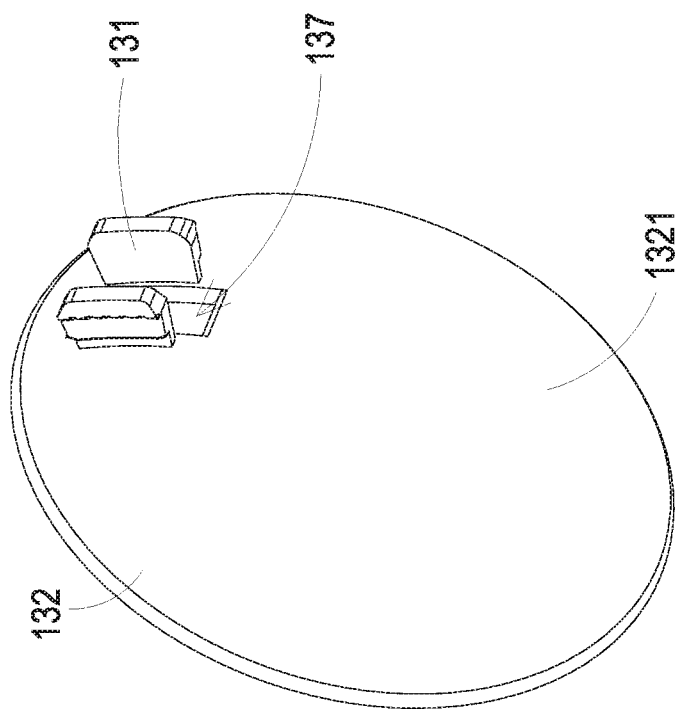
FIG. 3 is a perspective view illustrating the detachable detecting module of the detecting apparatus of FIG. 1A.

FIG. 2 is a perspective view illustrating the rotating and swing module of the detecting apparatus of FIG. 1A. FIG. 3 is a perspective view illustrating the detachable detecting module of the detecting apparatus of FIG. 1A. As shown in FIGS. 1A to 1D, 2 and 3, in the embodiment, the detachable detecting module 13 further includes a flying-saucer-shaped shell 132. The flying-saucer-shaped shell 132 is formed by but not limited to two convex discs engaged or adhered with each other. The flying-saucer-shaped shell 132 has a convex surface 1321 and a detecting surface 1322, and the engaged unit 131 is disposed on an off-center position of the convex surface 1321. On the other hand, the rotating disc 121 has a concave surface 1212 opposite to the convex surface 1321 of the detachable detecting module 13. The swing rail 122 further includes a guiding rack 1223 disposed on the concave surface 1212 and in contact with the convex surface 1321 of the detachable detecting module 13 so that the detachable detecting module 13 can be swung firmly at required deflecting angle along the swing rail 122. In the embodiment, the swing rail 122 of the rotating and swing module 12 is an arc-shaped toothed rack disposed on the concave surface 1212 of the 121 rotating disc 121. The swing rail 122 has plural teeth 1224 for indicating the deflecting angle of the detachable detecting module 13 relative to the rotating and swing module 12. In other embodiment, the swing rail 122 further includes a rail stopper 1221 and an installing opening 1222. The rail stopper 1221 is disposed at an end of the swing rail 122 for limiting the movement of the engaged unit 131 of the detachable detecting module 13 along the swing rail 122. The installing opening 1222 is disposed on the other end of the swing rail 122 for receiving the engaged unit 131 of the detachable detecting module 13 to fit in the swing rail 122 or detaching the detachable detecting module 13 from the swing rail 122. If the deflecting angle at the rail stopper 1221 of the swing rail 122 is regarded as 0°, the engaged unit 131 of the detachable detecting module 13 can be swung along the swing rail 122 at a maximum deflecting angle of for example but not limited to 50°. When the engaged unit 131 of the detachable detecting module 13 is swung along the swing rail 122 reaches a deflecting angle of 60°, the engaged unit 131 of the detachable detecting module 13 is moved to the installing opening 1222 and can be detached from the swing rail 122 through the installing opening 1222. In other embodiment, the deflecting angle at the position of the installing opening 1222 of the swing rail 122 is defined as 0°, and a maximum deflecting angle of the detachable detecting module 13 relative to the swing rail 122 is located at the position of the rail stopper 1221. It is noted that the deflecting range is not limited to the above embodiment, and can be adjusted according to the practical requirements. When the detecting apparatus 1 of the present invention can be employed as a motion detection sensor, it can perform the motion detection and form a vital component of security, automated lighting control, home control, energy efficiency, and other useful systems.

Figure 4:
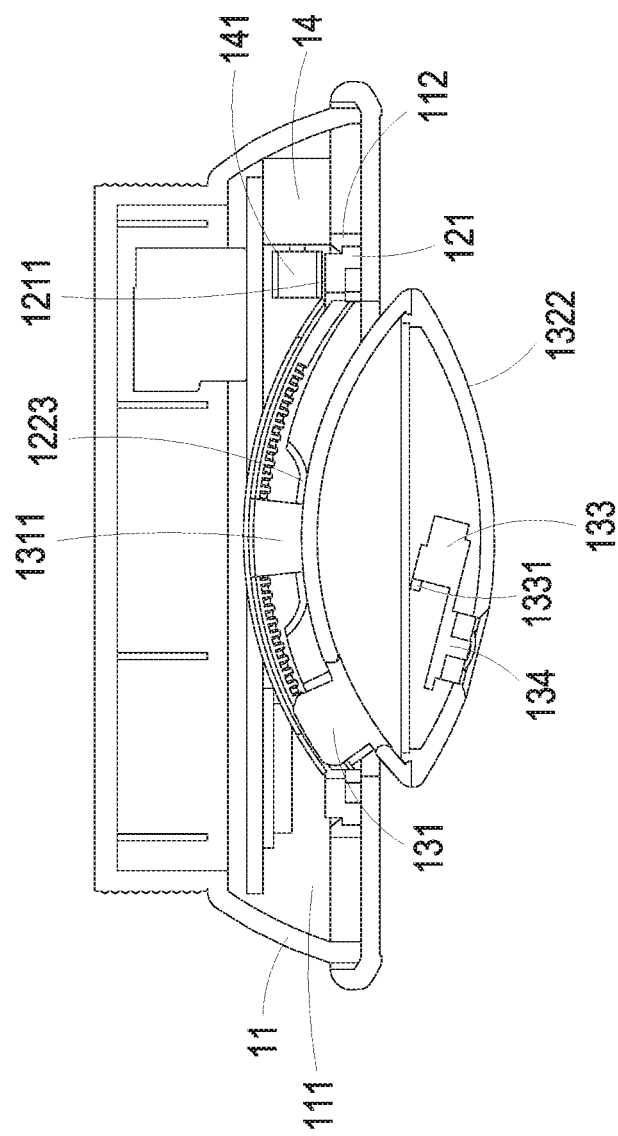
FIG. 4 is a schematic cross-sectional view illustrating a detecting apparatus having a detachable detecting module according to a second embodiment of the present invention.
Figure 5:
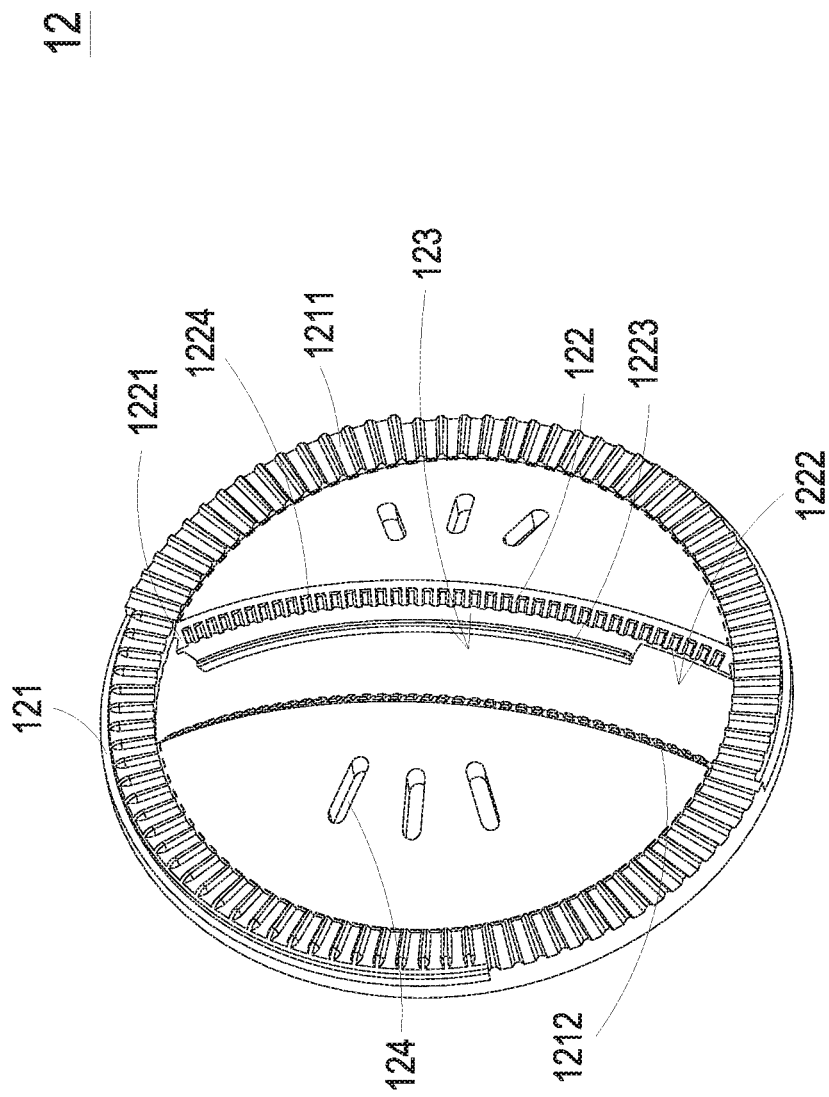
FIG. 5 is a perspective view illustrating the rotating and swing module of the detecting apparatus of FIG. 4.
Figure 6:
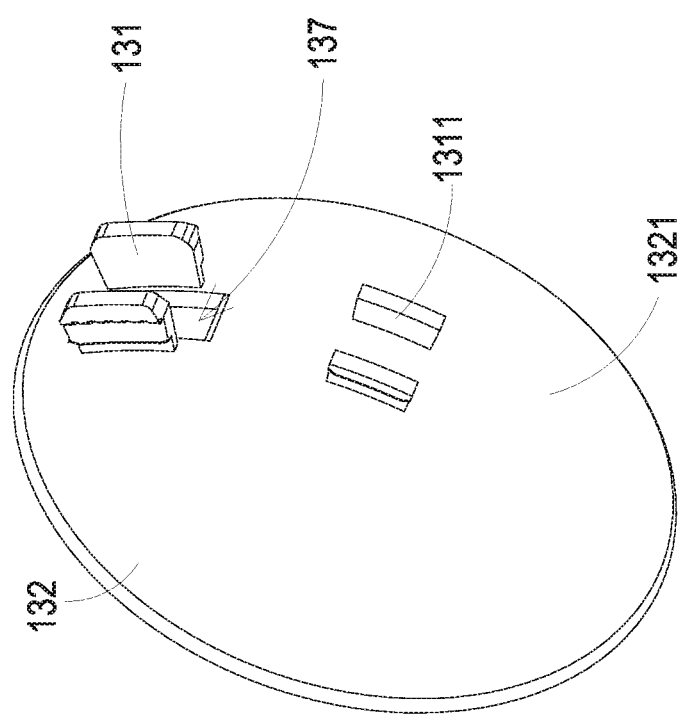
FIG. 6 is a perspective view illustrating the detachable detecting module of the detecting apparatus of FIG. 4.

FIG. 4 is a schematic cross-sectional view illustrating a detecting apparatus having a detachable detecting module according to a second embodiment of the present invention. FIG. 5 is a perspective view illustrating the rotating and swing module of the detecting apparatus of FIG. 4. FIG. 6 is a perspective view illustrating the detachable detecting module of the detecting apparatus of FIG. 4. As shown in FIGS. 4, 5 and 6, the structures, elements and functions of the detecting apparatus 1 are similar to those of FIGS. 1A to 1D, 2 and 3, provided with same reference symbols as those of the above embodiment, and are not redundantly described herein. Comparing with the embodiment of FIG. FIGS. 1A to 1D, 2 and 3, the detecting apparatus 1 of this embodiment further includes an electric motor 14 having a driving gear 141. The rotating disc 121 clamped by the clamp part 112 of the main body 11 further includes a rotating-cog portion 1211 disposed around at least one portion of the peripheral edge of the rotating disc 121. Consequently, the driving gear 141 of the motor 14 is engaged with the rotating-cog portion 1211 of the rotating disc 121 and can drive the rotating disc 121 to rotate at the horizontal angle in the clockwise and counterclockwise motion relative to the main body 11. The horizontal angle is for example but no limited to 45°. Namely, the swing rail 122 of the rotating and swing module 12 is rotated relative to the main body 11 at the same horizontal angle. In the embodiment, the swing rail 122 includes an arc-shaped guiding rack 1223 disposed on the concave surface 1212 of the rotating and swing module 12. The detachable detecting module 13 includes a guiding hook 1311 corresponding to the guiding rack 1223 and disposed on the convex surface 1321. The guiding hook 1311 of the detachable detecting module 13 is coupled with the guiding rack 1223 and restricted by the guiding rack 1223 for guiding and facilitating the engaged unit 131 of the detachable detecting module 13 to move smoothly along the swing rail 122 while the engage unit 131 of the detachable detecting module 13 is installed into the swing rail 122 from the installing opening 1222. Consequently, the detachable detecting module 13 can be swung along the swing rail 122 at a maximum deflecting angle relative to the rotating disc 121, and the maximum deflecting angle is for example but not limited to 50°.

Figure 7:
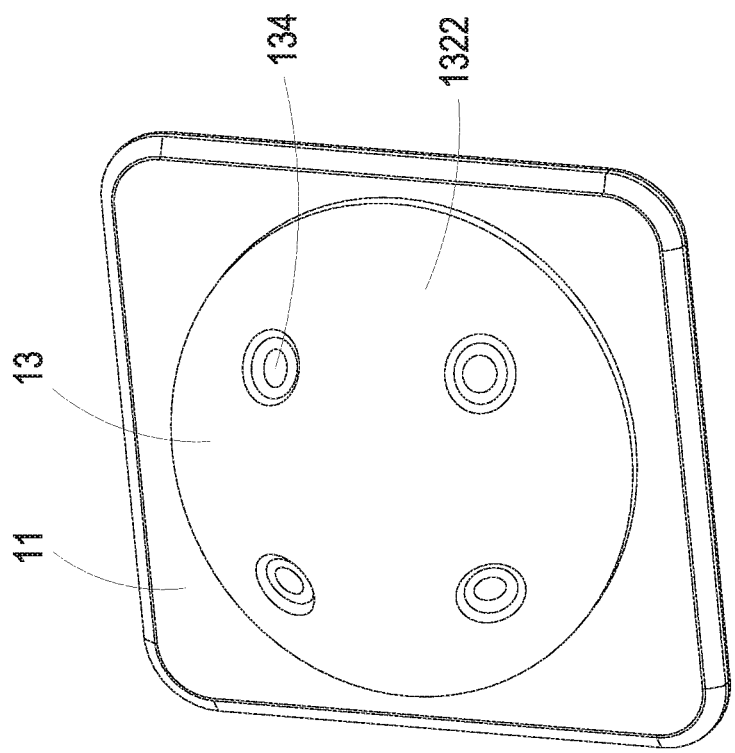
FIG. 7 is a perspective view illustrating a detecting apparatus according to a third embodiment of the present invention.

In the above embodiments, the detachable detecting module 13 has at least one sensor 134 disposed on a detecting surface 1322 of the flying-saucer-shaped shell 132. As shown in FIG. 1A, the sensor 134 of the detachable detecting module 13 is disposed on the center of the detecting surface 1322. In some embodiments, as shown in FIG. 4, the detachable detecting module 13 further has at least one sensor 134 disposed on an off-center position of the detecting surface 1322 to obtain a constant off-set angle for increasing the range of the deflecting angle. In other embodiment, as shown in FIG. 7, the detachable detecting module 13 includes plural sensors 134, for example but not limited to four sensors 134, disposed on the detecting surface 1322 in array arrangement. If a single sensor 134 has a detectable angle, for example but not limited to 46°, the detachable detecting module 13 having four sensors 134 combined and disposed thereon can increase the detectable angle to a wider range, for example but not limited to 120°. It is noted that the number and the arrangement of the sensors 134 included in the detecting apparatus 1 are not limited to the above embodiment, and can be adjusted according to the practical requirement. In the above embodiments, the sensor 134 of the detachable detecting module 13 is selected from a group consisting of an infrared sensor, an optical photographing system, a sound or vibration sensor, a pyroelectric human motion sensor, a thermopile sensor, a temperature and humidity sensor, a magnetic sensor, a gas sensor, or an integrated assembly thereof.

Please refer to FIGS. 1A to 1D and 4 again. In the above embodiments, the detachable detecting module 13 includes a detecting circuit 133 disposed in the flying-saucer-shaped shell 132 and electrically connected with the sensor 134. In addition, the detachable detecting module 13 further includes an indicating unit 1331 and a transparent window 135. The indicating unit 1331 can be but not limited to a solid-state lighting indicator, such as a LED indicator, disposed in the flying-saucer-shaped shell 132 and electrically connected with the detecting circuit 133 for indicating an operation status of the sensor 134. The transparent windows 135 is disposed on the detecting surface 1322 of the flying-saucer-shaped shell 132 and around the sensor 135 for showing the operation status of the sensor 134 indicated by the indicating unit 1331. For example, when a motion of people is detected by the sensor 134 and the detecting circuit 133, the indicating unit 1331 issues a lighting signal passing through the transparent window 135, so as to remind the user that the detecting apparatus 1 has detected the presence or motion of humans. In some embodiment, the flying-saucer-shaped shell 132 of the detachable detecting module 13 further includes a wiring opening 137 (shown in FIGS. 3 and 6) corresponding to the engaged unit 131 and disposed on the convex surface 1321 for facilitating a conductive wire (not shown) electrically connected with the detecting circuit 133 to pass through the wiring opening 137. In addition, the swing rail 122 of the concave surface 1212 includes a wiring slot 123 (shown in FIGS. 2 and 5) corresponding to the wiring opening 137 for facilitating the conductive wire of the detachable detecting module 13 to pass through the wiring slot 123 and moving without the restriction while the detachable detecting module 13 is swung along the swing rail 122. In other embodiment, as shown in FIG. 1C, the main body 11 of the detecting apparatus 1 further includes a printed circuit board 113 disposed in the receiving space 111. The printed circuit board 113 has an opening 1131 for facilitating the concave surface 1212 of the rotating disc 121 to pass through the opening 1131 partially. Consequently, the conductive wire of the detachable detecting module 13 is electrically connected with the printed circuit board 113 by passing through the wiring opening 137, the wiring slot 123 and the opening 1131 of the printed circuit board 113, and the detachable detecting module 13 can be swung without the restriction of conductive wire.

Figure 8A:
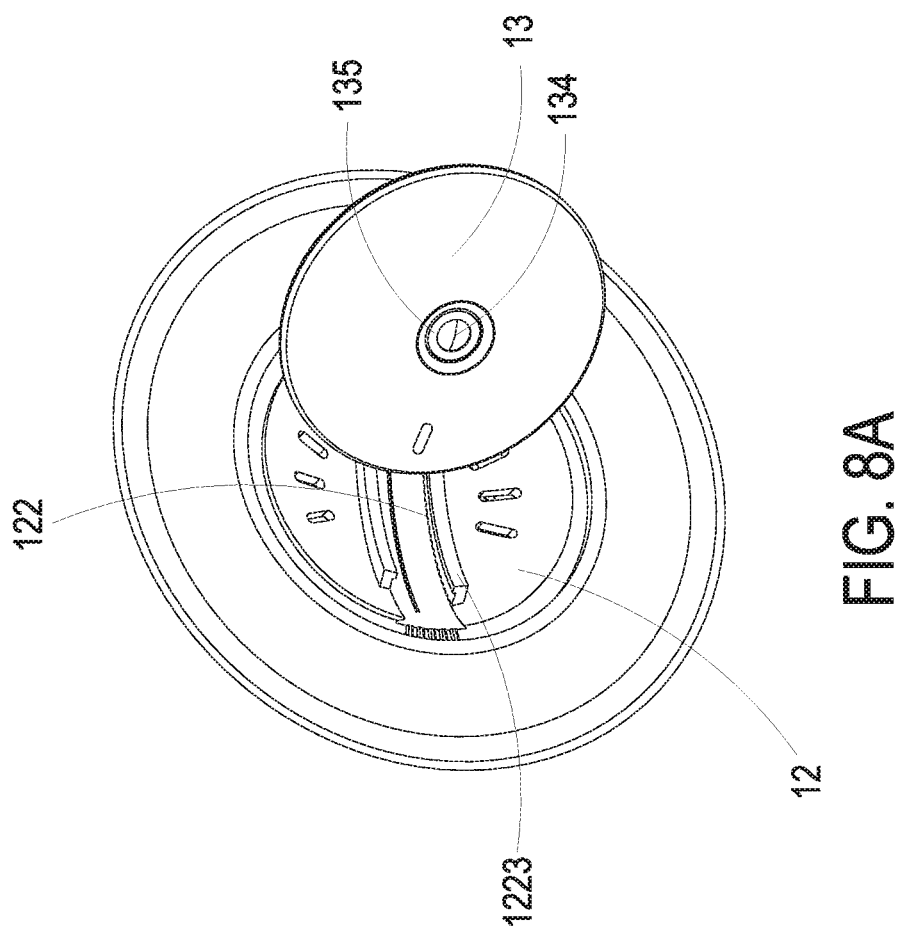
FIG. 8A is a perspective view illustrating a detecting apparatus according to a fourth embodiment of the present invention.
Figure 8B:
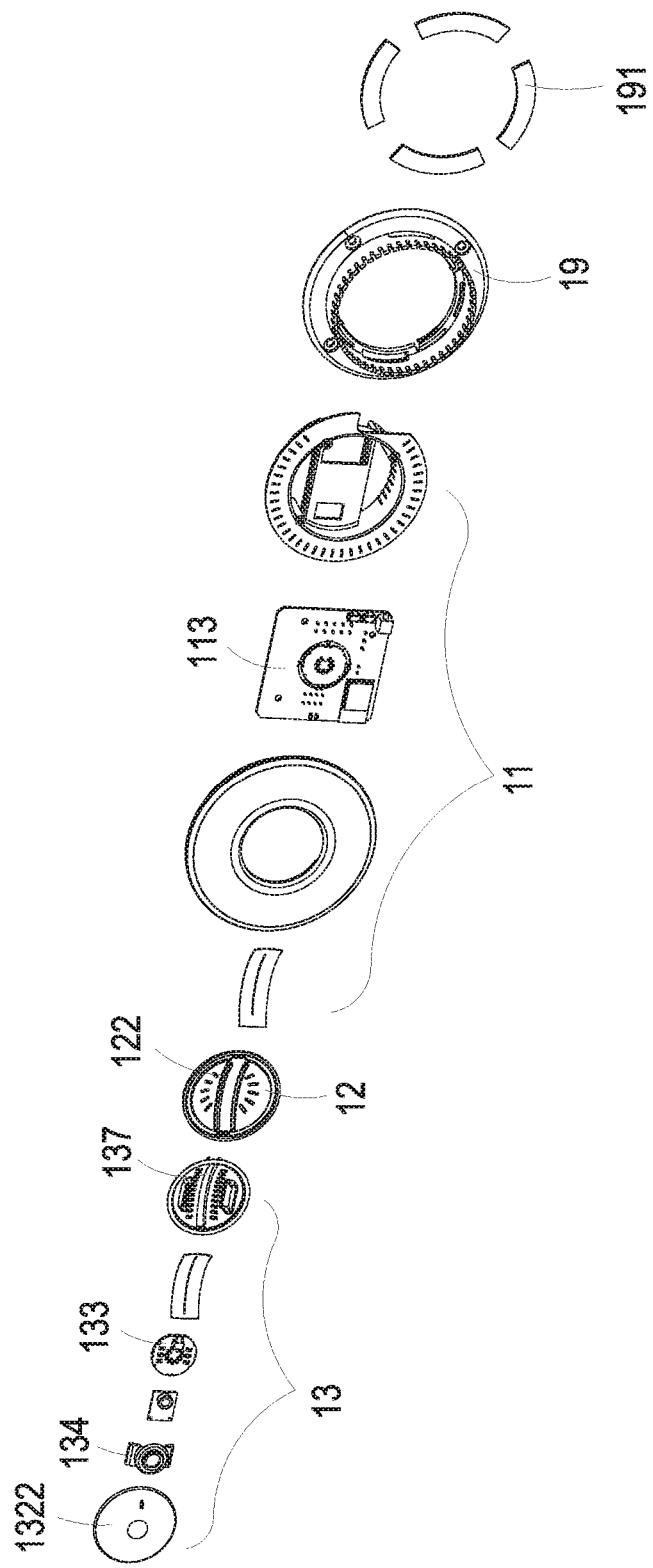
FIGS. 8B and 8C are exploded views illustrating the detecting apparatus having the detachable detecting module of FIG. 8A.
Figure 8C:
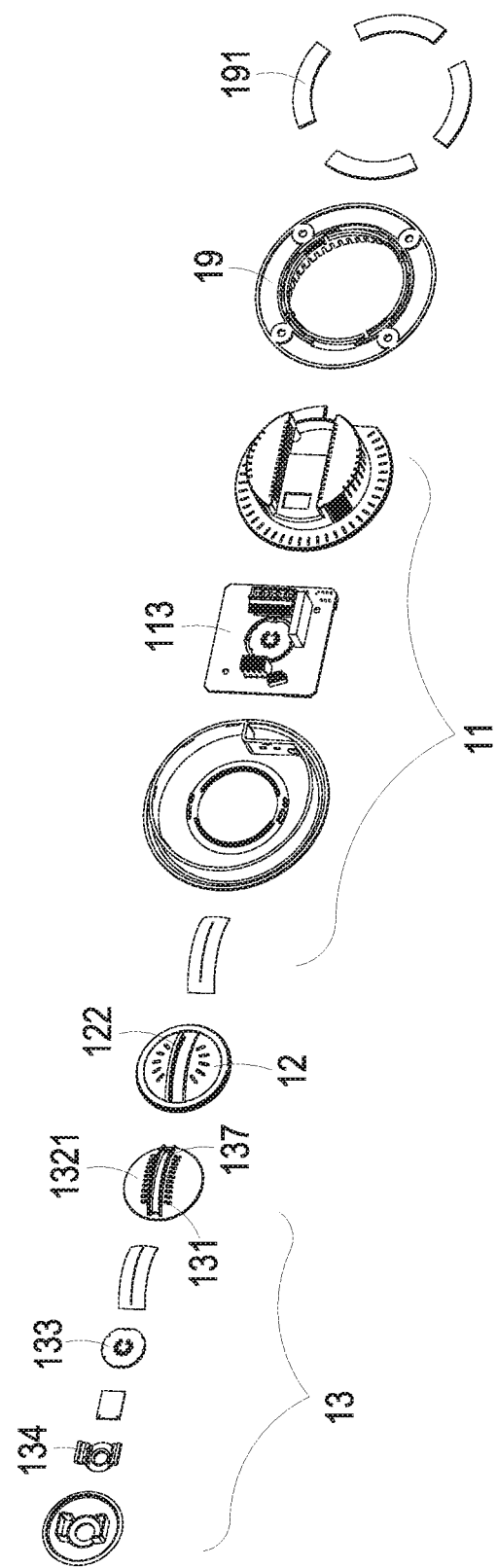
Figure 8D:
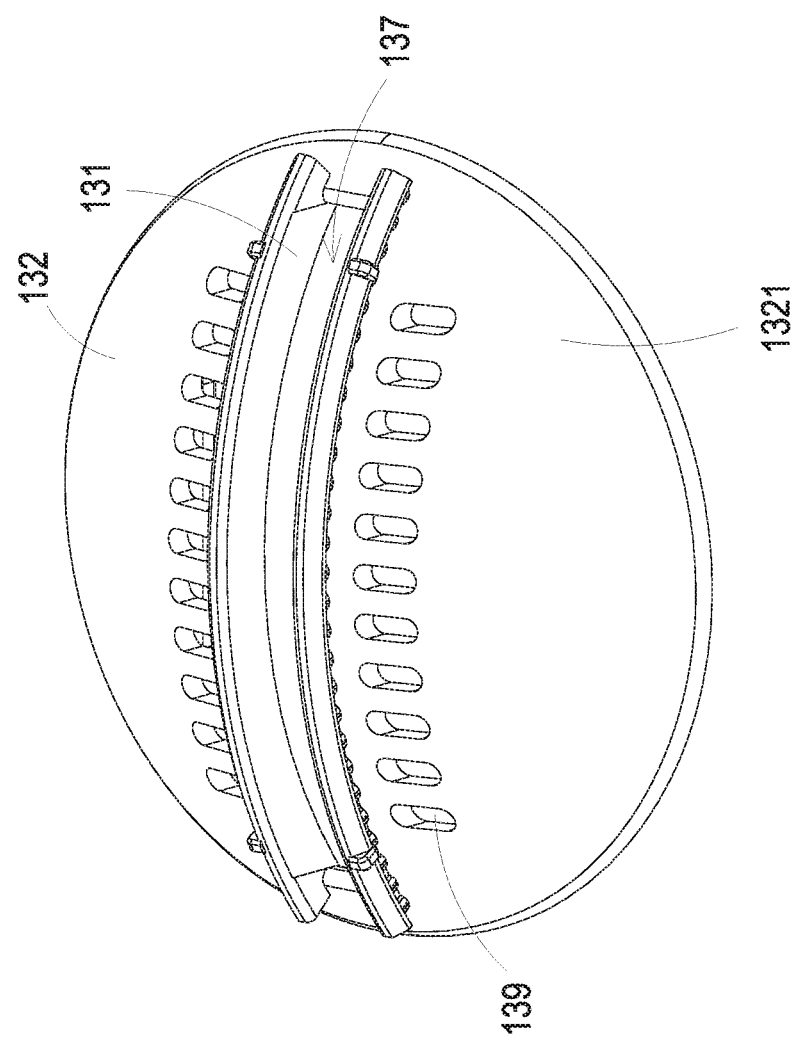
FIG. 8D is a perspective view illustrating the detachable detecting module of the detecting apparatus of FIG. 8A.

FIG. 8A is a perspective view illustrating a detecting apparatus according to a fourth embodiment of the present invention. FIGS. 8B and 8C are exploded views illustrating the detecting apparatus having the detachable detecting module of FIG. 8A. FIG. 8D is a perspective view illustrating the detachable detecting module of the detecting apparatus of FIG. 8A. As shown in FIGS. 8A to 8D, the structures, elements and functions of the detecting apparatus 1 are similar to those of FIGS. 1A to 1D, 2 and 3, provided with same reference symbols as those of the above embodiment, and are not redundantly described herein. Comparing with the embodiment of FIGS. 1A to 1D, 2 and 3, the main body 11 of the detecting apparatus 1 of this embodiment is designed as a circular shape according to the flying-saucer shape of the detachable detecting module 13, so as to save the space for installing the detecting apparatus 1. In addition, in the embodiment, the flying-saucer-shaped shell 132 of the detachable detecting module 13 also includes a wiring opening 137 corresponding to the engaged unit 131 and disposed on the convex surface 1321 for facilitating a conductive wire (not shown) electrically connected with the detecting circuit 133 to pass through the wiring opening 137. In the embodiment, the engaged unit 131 and the wiring opening 137 are stretched across the convex surface 1321, as shown in FIG. 8D. Comparing with the above embodiments, the engaged unit 131 disposed on the convex surface 1321 are located in wider range for facilitating the detachable detecting module 13 to swing smoothly and firmly along the swing rail 122 of the rotating and swing module 12. In the embodiment, the swing rail 122 also includes a guiding rack 1223 disposed on the concave surface 1212 (Please refer to FIG. 2). The engaged unit 131 of the detachable detecting module 13 is disposed relative to the guiding rack 1223, as shown in FIG. 2. When the engaged unit 131 is installed into the swing rail 122, the engaged unit 131 is guided by the guiding rack 1223 so that the engaged unit 131 of the detachable detecting module 13 can be swung firmly at required deflecting angle along the swing rail 122. In the embodiment, the engaged unit 131 of the detachable detecting module 13 and the swing rail 122 of the rotating and swing module 12 can engage with each other effectively in a wider range, and the detachable detecting module 13 can be swung and relative to the rotating disc 121 to match a maximum deflecting angle over 60°. Moreover, the wiring opening 137 is stretched across the convex surface 1321, so as to allow the conductive wire of the detecting circuit 133 to pass through while the detachable detecting module 13 is swung at the maximum deflecting angle. On the other hand, in the embodiment, the engaged unit 131 of the detachable detecting module 13 can be disposed on for example but not limited to an off-center position of the convex surface 1321, as shown in FIGS. 3 and 6. Each end of the engaged unit 131 can be installed into the swing rail 122 of the rotating and swing module 12, and the detachable detecting module 13 can be swung toward two opposite directions relative to the rotating disc 121 at the maximum deflecting angle, for example but not limited to 60°. Alternatively, in other embodiment, by means of adjusting the position of the engaged unit 131 disposed on the convex surface 1321 and selecting the setting direction of the engaged unit 131 relative to the swing rail 122 of the rotating and swing module 12, the detachable detecting module 13 can be swung at a maximum deflecting angle over 90°. Alternatively, the detachable detecting module 13 can be swung toward two sides and limited at a maximum deflecting angle of 30°, but the present invention is not limited thereto.

Figure 9:
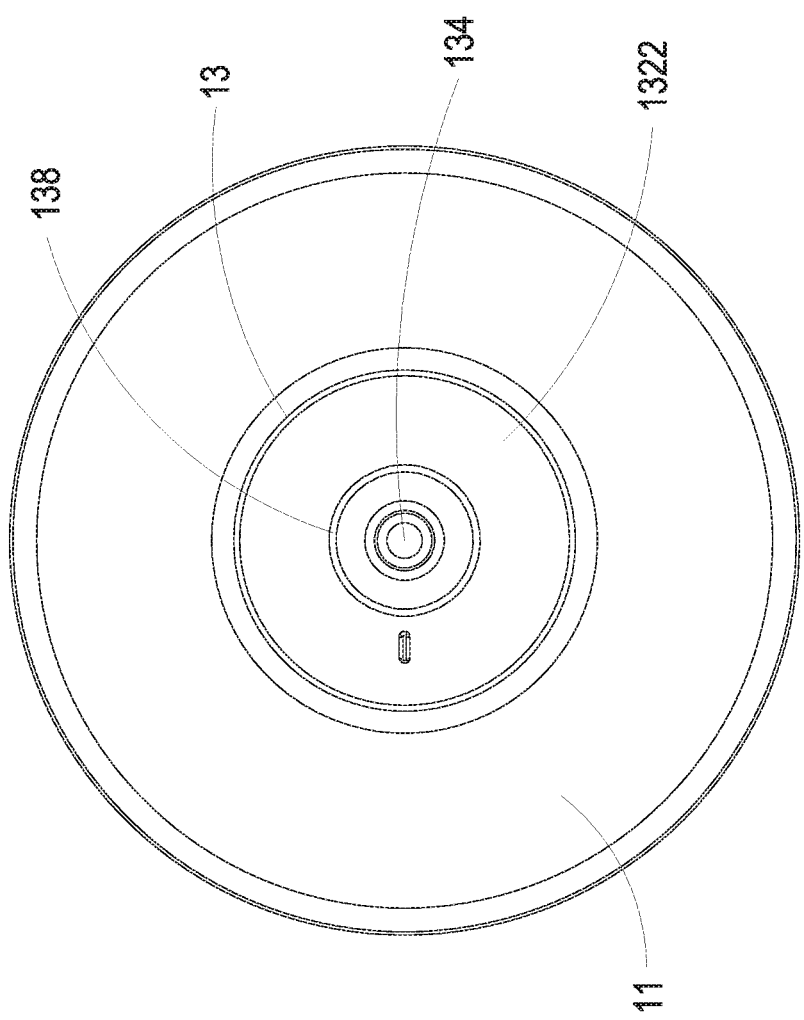
FIG. 9 is a plan view illustrating a detachable detecting module according to a fifth embodiment of the present invention.

In some embodiments, as shown in FIGS. 1C, 1D, 2 and 8A to 8C, the rotating and swing module 12 of the detecting apparatus 1 further includes at least one air vent 124 disposed on the concave surface 1212 corresponding to the detachable detecting module 13 for dissipating the heat generated by the detachable detecting module 13. In other embodiments, the detecting apparatus 1 further includes a gap 15 disposed between the rotating and swing module 12 and the detachable detecting module 13 for dissipating the heat generated by the detachable detecting module 13. In other embodiments, the main body 11 further includes at least one lateral vent 114 disposed on a lateral wall thereof for dissipating the heat generated by the detachable detecting module 13. Generally, heats are generated while the detachable detecting module 13 is working. If there are lots of heats accumulated within the detecting apparatus 1, the sensitivity of the detecting apparatus 1 will be influenced, and the sensor and the detecting circuit are even damaged due to the accumulated heat. Therefore, it is important to dissipate the heat generated by the detachable detecting module 13. The heat generated by the detachable detecting module 13 is transferred through the gap 15 between the rotating and swing module 12 and the detachable detecting module 13, the air vent 124 of the rotating and swing module 12 and the lateral vent 114 of the main body 11, so as to prevent from accumulating too much heat within the detecting apparatus 1 and further prevent the detachable detecting module 13 from being damaged effectively. As the above descriptions, the sensor 134 of the detachable detecting module 13 is selected from a group consisting of an infrared sensor, an optical photographing system, a sound or vibration sensor, a pyroelectric human motion sensor, a thermopile sensor, a temperature and humidity sensor, a magnetic sensor, a gas sensor, or an integrated assembly thereof. No matter what type of the sensor 134 is employed, the detachable detecting module 13 includes at least one air vent for dissipating the heat. FIG. 9 is a plan view illustrating a detachable detecting module according to a fifth embodiment of the present invention. In the embodiment, the detachable detecting module 13 further includes at least one circular vent 138 disposed on the detecting surface 1322 and around the sensor 134. The circular vent 138 is used for facilitating to dissipate the heat generated by the detachable detecting module 13. In addition, the detachable detecting module 13 further includes a least a heat-dissipating hole 139, as shown in FIG. 8D, disposed on the convex surface 1321 and corresponding to the air vent 124 of the rotating and swing module 12. Consequently, the circular vent 138, the heat-dissipating hole 139, the gap 15, the air vent 124 and the lateral vent 114 of the detecting apparatus 1 of the present invention form a smooth heat-dissipating system and heat-dissipating path for preventing the detecting sensitivity of the detachable detecting module 13 from being influenced due to the accumulated heat. Alternatively, the detachable detecting module 13 can include other attached heat-dissipating elements corresponding to the different sensors 134, and the present invention is not limited to the above embodiment and not redundantly described herein.

Figure 10:
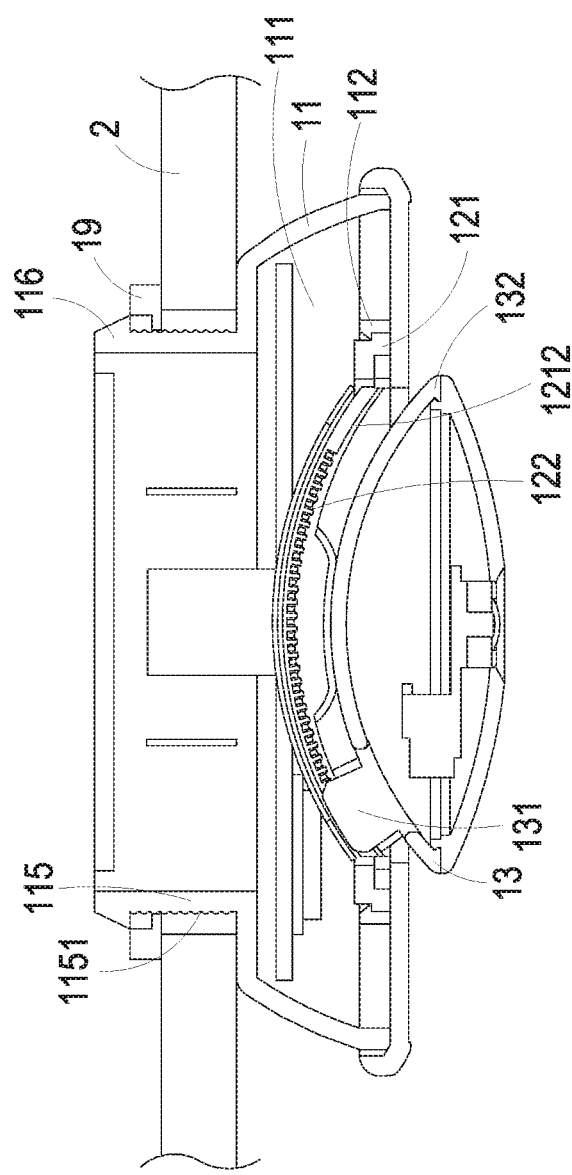
FIG. 10 is a cross-sectional view illustrating a first fixing mechanism for the detecting apparatus of the present invention.

In the embodiment, as shown in FIG. 10, the main body 11 of the detecting apparatus 1 further includes a neck area 115 and a locking thread 1151 disposed around at least one portion of the neck area 115, so as to fasten and fix the main body 11 into a specific slot of an object 2, for example a ceiling. The main body 11 of the detecting apparatus 1 further includes plural resilient buckles 116 disposed around the neck area 115. The detecting apparatus 1 further includes an auxiliary fixing frame 19 configured to cooperate with the plural resilient buckles 116 of the main body 11, for facilitating to fix the detecting apparatus 1 into the object 2 (i.e. ceiling) steadily. It is noted that the fixing mechanism of the detecting apparatus 1 is not limited to the above embodiment. FIG. 11 is a perspective view illustrating a second fixing mechanism for the detecting apparatus of the present invention. When the detecting apparatus 1 has to be fixed on a wall or a ceiling without digging a hole or passing therein, the detecting apparatus 1 includes an auxiliary fixing frame 19, and the auxiliary fixing frame 19 is fixed on the wall or the ceiling by an adhesive element 191, for example but not limited to an adhesive type. Alternatively, the auxiliary fixing frame 19 can be fixed on the wall or the ceiling by screws, and the present invention is not limited thereto. In the embodiment, the auxiliary fixing frame 19 has plural engaged slots 192 corresponding to the plural resilient buckles 116. The main body 11 is detachably fastened on the auxiliary fixing frame 19 while the plural resilient buckles 116 of the main body 11 are engaged with the plural engaged slots 192 of the auxiliary fixing frame 19.

Figure 12:
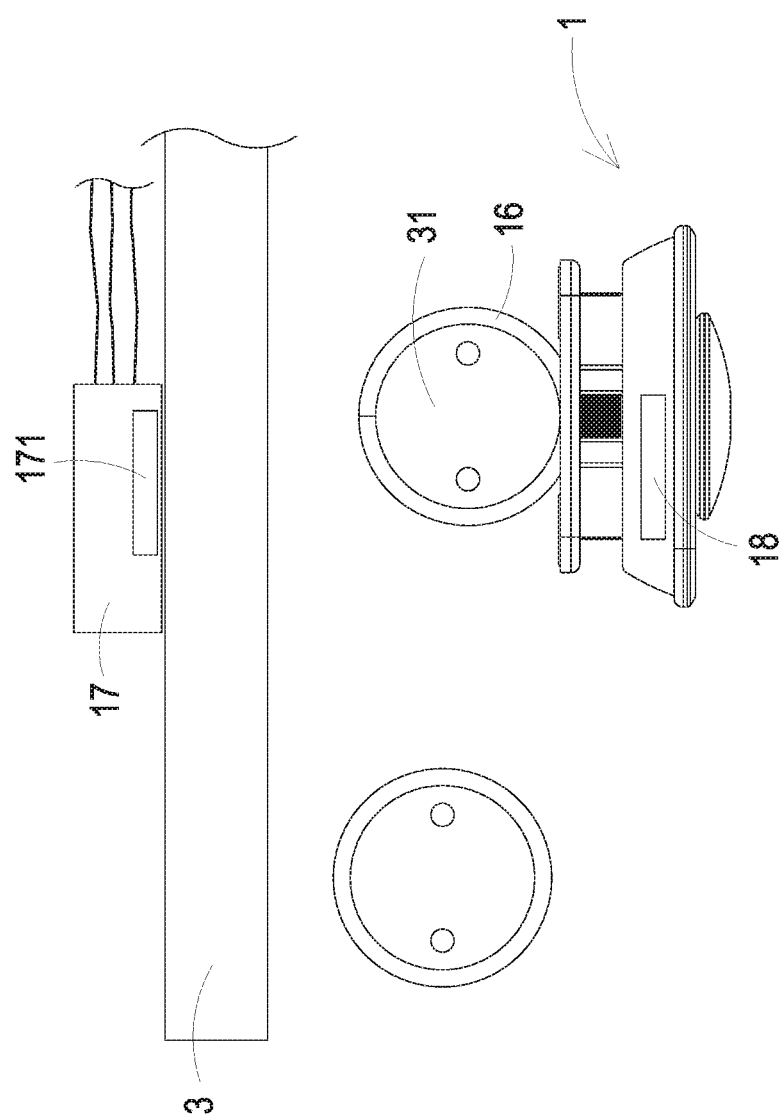
FIG. 12 is a front view illustrating a third fixing mechanism for the detecting apparatus of the present invention.
Figure 13:
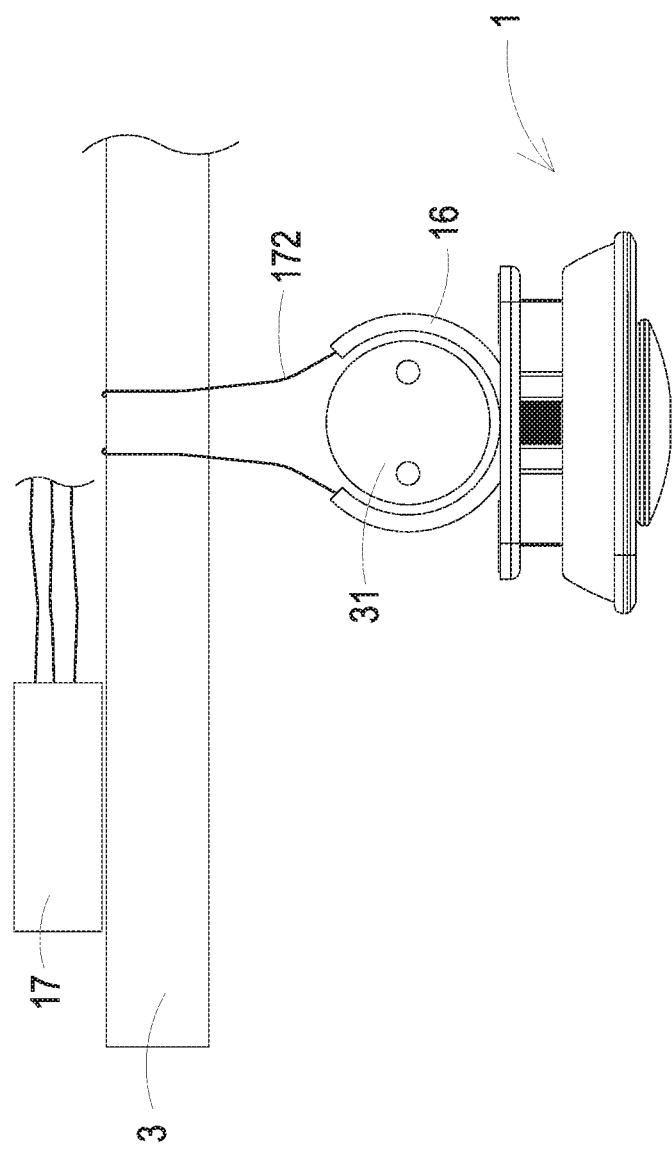
FIG. 13 is a front view illustrating a fourth fixing mechanism for the detecting apparatus of the present invention.

FIG. 12 is a front view illustrating a third fixing mechanism for the detecting apparatus of the present invention. As shown in FIG. 12, the detecting apparatus 1 further includes a clip unit 16 connected with the main body 11. The clip unit 16 can clamp an object, for example a lamp 31 set in a lamp holder 3, so that the clip unit 16 is fastened thereon. In some embodiment, the detecting apparatus 1 includes a wireless signal transmitter 18 disposed on the main body 11, and the lamp holder 3 includes a control module 17 having a wireless signal receiver 171, so that the wireless signal transmitter 18 of the detecting apparatus 1 and the wireless signal receiver 171 of the control module 17 disposed on the lamp holder 3 can communicate with each other. The detecting apparatus 3 issues a detecting signal to control the lamp 31 of the lamp holder 3 for performing the turning-on or turning-off operations. FIG. 13 is a front view illustrating a fourth fixing mechanism for the detecting apparatus of the present invention. As shown in FIG. 13, the detecting apparatus 1 also includes a clip unit 16 connected with the main body 11 and the clip unit 16 clamp the lamp 31 set in the lamp holder 3, so that the clip unit 16 is fastened thereon. Comparing with the above embodiments, the main body 11 of the detecting apparatus 1 of this embodiment is connected to the control module 17 via a conductive circuit 172. It is noted that the fixing mechanism of the detecting apparatus 1 is not limited to the above embodiments, and can be adjusted according to the practical requirements.

In summary, the present provides a detecting apparatus having a detachable detecting module. The detachable detecting module of the detecting apparatus can be adjusted and rotated according to the user requirements so as to obtain a larger detectable angle. The detectable angle of the detecting apparatus can be adjusted according to the monitoring environment by a manual operation or a motor-driven operation. In addition, plural detecting sensors can be combined and introduced into the detachable detecting module to increase the detectable angle. When the detecting module needs to be maintained or replaced by the user, it is easy to detach the detecting module from the main body of the detecting apparatus and maintain or replace the original detecting module with another one having same or different type.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motion detection device, comprising:
a main body having a receiving space and a clamp part;
a rotating and swing module disposed in the receiving space of the main body and having a rotating disc and a swing rail, wherein the rotating disc is clamped by the clamp part of the main body and rotated at a horizontal angle in a clockwise and counter clockwise motion relative to the main body, and the swing rail is disposed on the rotating disc; and
at least one detachable detecting module having a sensor and an engaged unit detachably engaged with the swing rail, wherein the detachable detecting module is swung along the swing rail through the engaged unit at a deflecting angle relative to the rotating disc.

2. The motion detection device according to claim 1, wherein the rotating disc comprises a rotating-cog portion disposed around at least one portion of a peripheral edge of the rotating disc.

3. The motion detection device according to claim 2, further comprising an electric motor having a driving gear, wherein the driving gear is engaged with the rotating-cog portion of the rotating disc for driving the rotating disc to rotate at the horizontal angle.

4. The motion detection device according to claim 1, wherein the detachable detecting module includes a flying-saucer-shaped shell having a convex surface, and the rotating disc has a concave surface corresponding to the convex surface of the detachable detecting module.

5. The motion detection device according to claim 4, wherein the engaged unit is disposed on an off-center position of the convex surface.

6. The motion detection device according to claim 4, wherein the swing rail is an arc-shaped toothed rack disposed on the concave surface and has plural teeth to indicate the deflecting angle of the detachable detecting module swung along the swing rail relative to the rotating disc.

7. The motion detection device according to claim 4, wherein the swing rail comprises:
a rail stopper disposed on an end of the swing rail for limiting the movement of the detachable detecting module; and
an installing opening disposed on the other end of the swing rail for receiving the engaged unit of the detachable detecting module to fit in the swing rail or detaching the detachable detecting module from the swing rail.

8. The motion detection device according to claim 4, wherein the swing rail comprises an arc-shaped guiding rack disposed on the concave surface.

9. The motion detection device according to claim 8, wherein the detachable detecting module further comprises a guiding hook corresponding to the guiding rack, disposed on the convex surface and coupled with the guiding rack and restricted by the guiding rack for guiding the detachable detecting module to swing at the deflecting angle along the swing rail.

10. The motion detection device according to claim 4, wherein the detachable detecting module further comprises
a detecting circuit disposed in the flying-saucer-shaped shell, and
the sensor is disposed on a detecting surface of the flying-saucer-shaped shell and electrically connected with the detecting circuit.

11. The motion detection device according to claim 10, wherein the detachable detecting module further comprises:
an indicator disposed in the flying-saucer-shaped shell and electrically connected with the detecting circuit to indicate an operation status of the sensor; and
a transparent window disposed on the detecting surface of the flying-saucer-shaped shell and around the sensor to show the operation status of the sensor indicated by the indicator.

12. The motion detection device according to claim 10, wherein the flying-saucer-shaped shell further comprises a wiring opening corresponding to the engaged unit and disposed on the convex surface for facilitating a conductive wire electrically connected with the detecting circuit to pass therethrough.

13. The motion detection device according to claim 10, wherein the flying-saucer-shaped shell further comprises:
a circular vent disposed on the detecting surface of the flying-saucer-shaped shell and around the sensor; and
at least one heat-dissipating hole disposed on the convex surface of the flying-saucer-shaped shell.

14. The motion detection device according to claim 4, wherein the main body further comprises a printed circuit board disposed in the receiving space and having an opening for facilitating the concave surface of the rotating disc to pass through the opening partially.

15. The motion detection device according to claim 4, wherein the rotating and swing module includes at least one air vent disposed on the concave surface, the main body includes at least one lateral vent disposed on a lateral wall thereof, and a gap is formed between the concave surface of the rotating disc and the convex surface of the flying-saucer-shaped shell.

16. The motion detection device according to claim 1, wherein the main body comprises a neck area and a locking thread disposed around at least one portion of the neck area.

17. The motion detection device according to claim 16, wherein the main body further comprises plural resilient buckles disposed on the neck area, and the detecting apparatus further comprises an auxiliary fixing frame having plural engaged slots corresponding to the plural resilient buckles, wherein the main body is detachably fastened on the auxiliary fixing frame while the plural resilient buckles of the main body are engaged with the plural engaged slots of the auxiliary fixing frame.

18. The motion detection device according to claim 1, further comprising a clamp connected with the main body and clamping an object to fasten the main body on the object.

19. The motion detection device according to claim 1, wherein the detachable detecting module includes at least one sensor selected from a group consisting of an infrared sensor, an optical photographing system, a sound or vibration sensor, a pyroelectric human motion sensor, a thermopile sensor, a temperature and humidity sensor, a magnetic sensor, a gas sensor, or an integrated assembly thereof.

\* \* \* \* \*